United States Patent [19]

Riead

[11] Patent Number: 4,461,114

[45] Date of Patent: Jul. 24, 1984

[54] FISHING FLOAT

[76] Inventor: John T. Riead, Rte. 2, Box 25, Cameron, Mo. 64429

[21] Appl. No.: 392,888

[22] Filed: Jun. 28, 1982

[51] Int. Cl.³ .............................................. A01K 93/00
[52] U.S. Cl. .................................... 43/17.5; 43/43.14; 43/44.95
[58] Field of Search .............. 43/17.5, 17, 17.1, 43.14, 43/43.15, 43.1, 44.95

[56] References Cited

U.S. PATENT DOCUMENTS

| | | | |
|---|---|---|---|
| 2,088,201 | 7/1937 | Goertzen | 43/44.95 |
| 2,490,669 | 12/1949 | Burke | 43/17.5 |
| 2,820,317 | 1/1958 | Irwin | 43/44.95 |
| 3,664,053 | 5/1972 | Beverly | 43/43.14 |
| 3,739,513 | 6/1973 | Durham | 43/17 |

FOREIGN PATENT DOCUMENTS

| | | | |
|---|---|---|---|
| 1404602 | 5/1965 | France | 43/43.14 |
| 174462 | 10/1965 | U.S.S.R. | 43/17.5 |

Primary Examiner—Gene P. Crosby

[57] ABSTRACT

A fishing float, or "bobber", is disclosed having a hollow buoyant body member which is at least partially transparent, and containing an electric lamp bulb, an electric battery and a resiliently operable electric switch connected in series with the bulb, the body member carrying a line lock adapted to be secured to an intermediate point of a fishing line so that a leader portion of the line depends from the body for attachment of a fishhook, bait, lure, sinker or the like to the lower end thereof. Tension on the leader is operable to close the switch against a tension spring to actuate the bulb. The float body has a chamber to which water may be added to vary the buoyancy of the float, and the switch spring is adjustable to vary the sensitivity of the switch.

3 Claims, 5 Drawing Figures

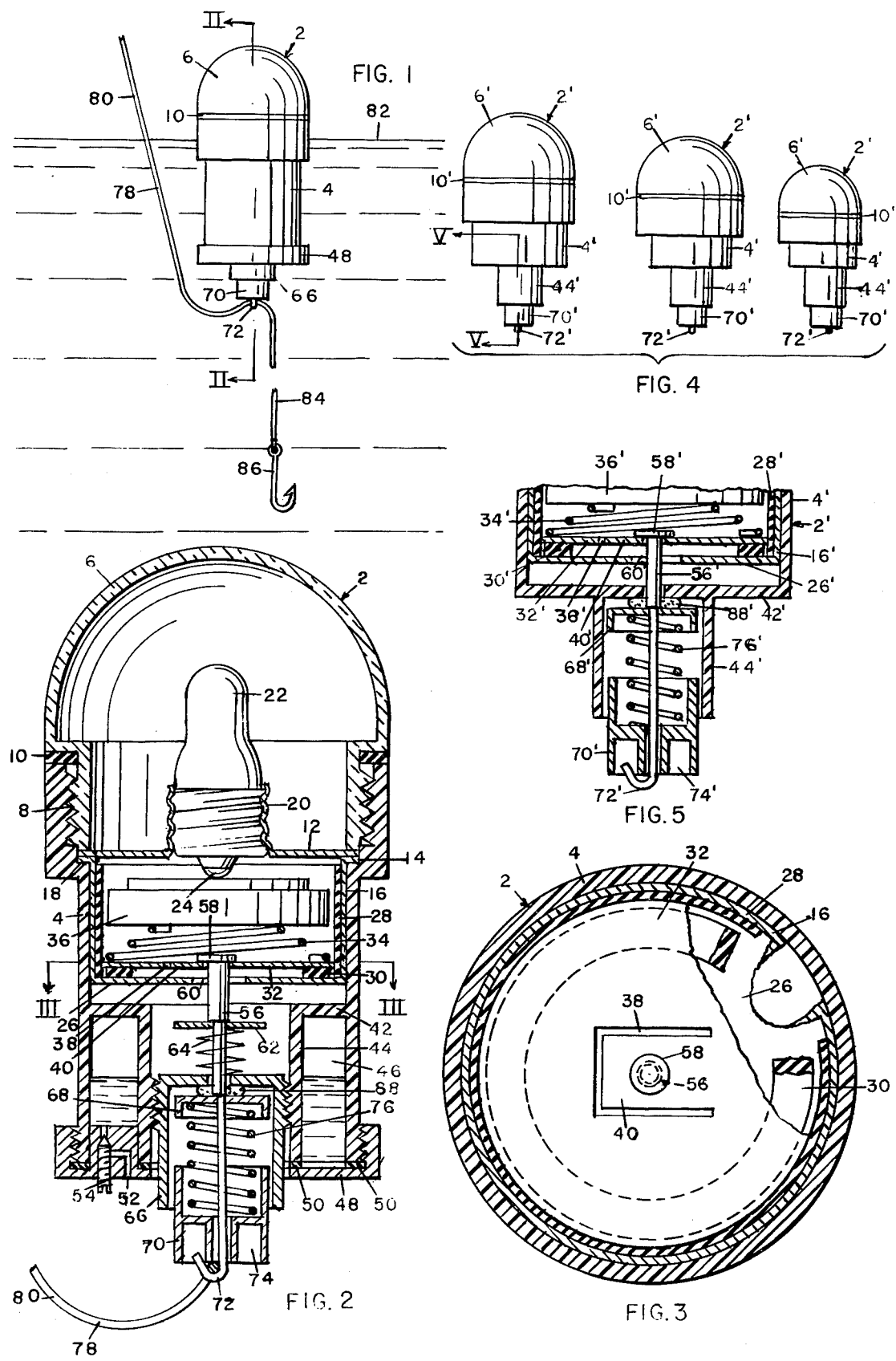

FISHING FLOAT

This invention relates to new and useful improvements in fishing gear, and has particular reference to a fishing float, or "bobber", which in general is a buoyant device adapted to float on a water surface, while attached to a point of a fishing line intermediate the fishing rod and the hook or lure at the end of the line. The float supports the hook or lure, and is caused to bob on the water surface, or to be submerged, when a fish takes the bait, thereby giving the fisherman a signal that a fish has bitten, and that he should pull the line to set the hook and reel in the fish. This general function of fishing floats is well known in the art, as also is the inclusion of a lamp bulb and battery in the float body, the bulb being actuated by an increase in tension of the leader portion of the line, which is that portion of the line between the float and the hook. The lamp is of course particularly useful in night fishing.

However, floats of this type have heretofore been subject to certain shortcomings and inherent inefficiencies. The leader load, which is the weight of the leader portion of the line, plus the weight of the fishhook, bait or lure, and sinker attached to its lower end, may vary substantially depending on the nature, weight and number of these attached elements, and the buoyancy of the lure body should be only slightly greater than the leader load. If the leader load is too great for a float of a given buoyancy, it will simply submerge the float, destroying its basic utility, while a leader load too small for the buoyancy of a given float will cause the hook, lure, etc. to be supported too rigidly, with the float resisting submergence relatively strongly. Under the latter condition, many fish, aided by the overly strong resistance of the float to submergence, are known to be quite capable of nibbling the bait from the hook, and escaping without being snagged. Ideally, the float should be only slightly buoyant under a normal leader load, and capable of being submerged by a very slight additional leader load occasioned by a fish taking the bait, preferably in the approximate range of one ounce or less. In other words, the resistance of the float to submergence should be so slight that a fish taking the bait should be free to "run" with the bait, submerging the float, with very little resistance. The bobbing or submergence of the float will still give the desired signal to the fisherman in order that he may pull strongly on the line to set the hook.

If the float body is equipped with a lamp bulb as described, the problem is compounded, since the sensitivity of the lamp actuating switch must be closely correlated to the buoyancy of the float body. If the switch is too sensitive, the lamp may light even when a fish has not taken the bait, the switch being closed by the normal leader load alone, or by ripples at the water surface. If the switch is too insensitive, the leader load occasioned by a fish's taking the bait may not close the switch at all, or only after the float is submerged, in view of the already only slight float buoyancy. Therefore, for maximum efficiency, the float buoyancy should be only very slightly greater than its own weight plus the variable leader load applied thereto, so that it is submerged by only a slight increase in leader load which occurs when a fish takes the bait, and the lamp switch sensitivity should be such that the switch is closed by a still smaller increase in the leader load.

In the past, therefore, a fisherman necessarily was required to equip himself with a possibly large number of floats, varying both as to buoyancy, and also as to switch sensitivity if a lamp is desired for night fishing, in order to be properly prepared for the use of varying types of hooks, baits, lures, sinkers or the like which he might desire to use.

Accordingly, the primary object of the present invention is the provision of a fishing float having means for variably adjusting both the buoyancy of the float body, and the sensitivity of the lamp actuating switch, to the end that a single float may serve under all reasonable conditions of both day and night fishing, regardless of the weight of the hooks, baits, lures, sinkers or the like the fisherman may desire to attach to his line.

Another object is the provision of a float of the character described in which the buoyancy adjustment is provided by a water chamber formed in the lure body, into which water may be introduced in continuously variable quantities to decrease the float buoyancy, or removed to increase the buoyancy.

A further object is the provision of a float of the character described wherein the switch sensitivity adjustment is provided by a switch including a flexible switch arm deflectable by the leader load to engage a fixed switch element to close the switch, and a spacer of variable thickness normally spacing said switch arm and fixed switch element apart, whereby to adjust the degree of leader tension required to close said switch.

A still further object is the provision of a float of the character described wherein said switch sensitivity adjustment is provided by a spring yieldably resisting closure of said switch, and means operable to adjust the tension of said spring.

Other objects are simplicity and economy of construction, and efficiency and dependability of operation.

With these objects in view, as well as other objects which will appear in the course of the specification, reference will be had to the accompanying drawing, wherein:

FIG. 1 is a side elevational view of a fishing float embodying the present invention, shown operatively connected to a fishing line and floating at a water surface, FIG. 2 is an enlarged sectional view taken on line II—II of FIG. 1, with parts left in elevation, FIG. 3 is an enlarged sectional view taken on line III—III of FIG. 2, with parts broken away, and with the contact spring omitted, FIG. 4 is a side elevational view of a set of three floats of slightly modified form, and FIG. 5 is an enlarged, fragmentary sectional view taken on line V—V of FIG. 4.

Like reference numerals apply to similar parts throughout the several views, and referring first to the species of the invention shown in FIGS. 1-3, the numeral 2 applies generally to the body of the float. Said body comprises a base 4 and a dome 6. Base 4 is generally cylindrical in form, with its axis normally vertical, and is formed of an electrical insulating material such as plastic, and is open at its upper end. Dome 6 is formed of an electrical insulating material such as plastic, which is transparent or translucent. The dome is open at its lower end, and is threaded into the upper end of base 4 as at 8, the connection being sealed water-tight by a soft gasket 10. The lower edge of said dome presses a circular electrically conductive plate 12 against an outturned flange 14 at the upper end of an electrically conductive cup 16, said flange resting on an upwardly facing shoulder 18 formed interiorly in base 4. Centrally of plate 12, it is formed to present a threaded socket 20 in which is mounted an electric lamp bulb 22, with the base contact 24 of said lamp disposed beneath said plate. Cup 16 extends downwardly from shoulder 18, fitting snugly within base 4, and is provided with a flat bottom wall 26. The cup is provided with a liner sleeve 28 of electrically insulating material, and a flat annular washer 30, also of insulating material, rests on bottom wall 26. Resting on washer 30, and insulated from cup 16 by said washer and sleeve 28, is a circular switch plate 32. A tapered helical contact spring 34 rests on switch plate 32, and serves to connect said plate to one terminal of a flat electric battery 36, and presses the other battery terminal upwardly against the bottom contact button 24 of lamp 22. A U-shaped slot 38 is formed centrally in plate 32, as best shown in FIG. 3, whereby to constitute the central portion of said plate as a resilient switch arm 40 which may be deflected downwardly to contact bottom wall 26 of cup 16 to complete the circuit of lamp bulb 22, as will be described. The circuit is normally interrupted by the gap between switch arm 40 and cup wall 26, and the width of this gap is determined by the thickness of washer 30.

Below cup bottom wall 26, but substantially above the bottom of base 4, said base is provided with a horizontal interior wall 42 provided with a depending tube 44 integral therewith, said tube being concentric with the outer base wall and depending coextensively therewith. The space between the outer base wall and tube 44 forms a water chamber 46, sealed at its lower end by an annular cap 48 and gaskets 50, which leaves tube 44 open at its lower end. Water may be introduced into or removed from chamber 46 through a passageway 52 formed through cap 48, said passageway being controlled by a manually operable screw valve 54.

Switch arm 40 is operated to close the switch by a stem 56 which is disposed vertically and concentrically in float base 4. Said stem is provided at its upper end with an enlarged head 58 which bears downwardly against switch arm 40, and then extends downwardly through a hole smaller than said head formed therefor in said switch arm, then through a hole 60 formed in cup bottom wall 26 into the upper portion of tube 44, hole 60 being large enough that said stem does not touch cup wall 26, then through a washer 62 bearing upwardly against a downwardly facing shoulder of said stem, then through a fine adjusting spring 64 disposed about said stem, then through a hole formed therefor in an adjusting collar 66 of inverted cup shape threaded axially into tube 44 and projecting therebelow, and into said cup. Spring 64 may be compressed between washer 62 and collar 66, and its degree of compression adjusted by turning said collar manually. Thus the closure of the switch is yieldably resisted both by the resilience of switch arm 40, and also by spring 64, and this composite resistance determines the sensitivity of the switch. Within collar 66, the stem projects through a washer 68 which bears upwardly against a downwardly facing shoulder of the stem, then slidably through a lock plunger 70 which is slidable in and projects outwardly from collar 60, and is rebent at its extreme end to form a re-entrant hook 72 which retains the lock parts in assembly, and enters an annular socket 74 formed in the outer end of the plunger. A coil spring 76 is carried on the stem and is compressed between washer 68 and plunger 70. A small amount of plastic lubricant 88 is disposed around the stem between washer 68 and the top end wall of collar 66, to prevent leakage of water through the stem hole of said collar. Spring 76 does not affect the sensitivity of switch 40, but permits plunger 70 to be pressed manually inwardly, against the spring tension, in order to open hook 72, whereupon an intermediate point of a fishing line 78 may be introduced into said hook, and clamped thereby against the plunger by said spring when the plunger is released. One portion 80 of the line then extends upwardly to the fisherman's rod, when the float body is floating at a water surface 82 as shown in FIG. 1, and another portion 84 of the line, denoted the leader, depends from the float and has a fishhook 86 secured to its lower end. In addition to one or more fishhooks, the leader may also carry a lure, natural or artifical bait, a lead sinker, or the like, not shown but well known in the art, the total weight of which may vary to a substantial degree.

In use, the fishing line 78 is first clamped in hook 72 to provide a leader 84 of the desired length, in order to permit fishing at the desired depth below the surface, and the fishhooks, lures, baits, sinkers or the like which it is intended to use are attached to the lower end of said leader. The float body 2 is then deposited in the water, with the leader depending therefrom, and the depth to which said float body submerges in the water is observed. As previously discussed, it is desired that the float body be only slightly buoyant under the existing leader load, so that it will be submerged completely by a very slight additional leader load, perhaps one ounce or less which occurs when a fish takes the bait. The float buoyancy is determined by the water displacement volume of that portion thereof above the water level, and should be constant regardless of the variable leader load applied thereto. The depth to which it should submerge while floating, and at which it will possess the desired slight degree of buoyancy, may be indicated by a mark, not shown, applied to the side of the float body. If, when the float is deposited in water as described, it floats too high, that is with too much of its volume above the water level, this indicates that the buoyancy is excessive, and that complete submergence thereof would require so much added leader load applied by a fish that the fish could nibble away the bait and escape without being snagged on a hook. In other words, the buoyancy is too great for the normal leader load actually applied. This situation may be corrected in the present lure by opening valve 54 with a screw driver or the like, and allowing water to flow through passageway 52 into chamber 46. This may be accomplished conveniently by inverting the float body in the water with valve 54 open, so that air trapped in the chamber may bubble out through passage 52 as water enters. The natural buoyancy of the float is reduced by water introduced into the chamber, and when the proper amount has been introduced, as may be determined experimentally, the float body will float with the desired slight degree of buoyancy. If the float rides too low in the water under the existing normal leader load, or submerges completely, it cannot perform its normal functions efficiently, or perhaps not at all, but this circumstance can be corrected by opening valve 54 and removing some of the water from chamber 46. The float is so designed, as to size and weight, that it will float with the desired degree of buoyancy when there is no water in chamber 46, and with the greatest leader load likely to be used under any normal circumstances.

Once the float buoyancy has been properly adjusted as described above, the sensitivity of lamp switch 40 is correspondingly adjusted by turning collar 66 to adjust the tension of spring 76. This sensitivity must not be so great that the lamp is lighted at all times by the normal leader load, or is lighted intermittently by waves or other water movement to give false signals that a fish has taken the bait. On the other hand, the sensitivity must be sufficiently great that the lamp will be lighted by an additional leader load less than that required to submerge the float completely. Otherwise the lamp might not light at all, or only after the float was submerged, when it would be useless. Turning collar 66 adjusts the tension of spring 64, and the adjustment may be made with the float in the water, taking care that the lamp does not light under normal leader load, or under any normal and reasonable agitation of the float, but does light in response to a downward pull on the leader, before the float body submerges completely. Spring switch arm 40 is sufficiently delicate that, when spring 64 is completely relaxed, arm 40 will provide the desired sensitivity under the lightest normal leader load likely to be encountered, while spring 64 is sufficiently heavy to be capable of reducing the switch sensitivity to a level adapted to the greatest normal leader load likely to be encountered.

The modified float form shown in FIGS. 4 and 5 utilizes a series of float bodies of graduated sizes rather than the single float body of the preferred form shown in FIGS. 1–3. The varied sizes of the float bodies in FIG. 4 determine their buoyancy, and a particular float is in each case selected for use to correspond to the leader load contemplated for use. The float bodies 2' shown in FIGS. 4 and 5 are otherwise similar to that shown in FIGS. 1–3, corresponding parts being indicated by corresponding primed numerals, except that cap 48 and the outer base wall below horizontal wall 42' is eliminated, so that there is no water chamber 46, spring 64 and its adjusting collar 66 are eliminated, and body base tube 44' is reduced in diameter to include only lock plunger 70 therein. The sensitivity of switch arm 40' can be adjusted only by inserting insulating washers 30' of different thicknesses. The operation of the FIGS. 4–5 system floats is substantially the same as that of the float of FIGS. 1–3, except of course that buoyancy adjustments can be made only by selection of the proper float body 2' for use in a given case, and switch sensitivity can be adjusted only by interchanging washers 30'. While neither of these adjustments is infinitely variable in operation, and hence can be only approximate, nevertheless the system is technically easier to use, and a relatively small number of float bodies 2' may be designed which will be satisfactory under most normal conditions. Many fishermen are creatures of habit, and customarily use about the same leader loads, so that a small number of floats 2', initially properly selected and set, could satisfy most of their needs.

While I have shown and described certain specific embodiments of my invention, it will be readily apparent that many minor changes of structure and operation could be made without departing from the spirit of the invention.

What I claim as new and desire to protect by Letters Patent is:

1. A fishing float comprising:
   a. a hollow, buoyant body member adapted to float at a water surface,
   b. means operable to affix an intermediate point of a fishing line to said body member, whereby to provide a leader portion of said line depending from said body member through the water to fishhooks, baits, lures, sinkers or the like attached to its lower end,
   c. a lamp bulb mounted in said body member, and visible when lighted through a transparent portion of said body member,
   d. an operative electrical circuit for said lamp bulb including said bulb, a power source and a normally open electric switch, both mounted in said body member,
   e. means operable by increased tension on said leader to close said switch to actuate said bulb, and
   f. means whereby the degree of increased leader tension required to close said switch may be adjusted, said electrical switch comprising a fixed switch member carried by said body member, a resilient switch member having a portion thereof fixed in said body member and a portion thereof deflectable toward said fixed switch member by said switch operating means, responsively to added tension of the leader portion of said fishing line, and an insulating spacer disposed between and preventing contact between fixed portions of said switch members, the thickness of said spacer also setting the normal spacing between said fixed switch member and the deflectable portion of said resilient switch member, said spacer being interchangeable with other spacers of different thickness, whereby to change the sensitivity of said switch to increases in the leader pull.

2. A fishing float comprising:
   a. a hollow, buoyant body member adapted to float at a water surface,
   b. means operable to affix an intermediate point of a fishing line to said body member, whereby to provide a leader portion of said line depending from said body member through the water to fishhooks, baits, lures, sinkers or the like attached to its lower end,
   c. a lamp bulb mounted in said body member, and visible when lighted through a transparent portion of said body member,
   d. an operative electrical circuit for said lamp bulb including said bulb, a power source and a normally open electric switch, both mounted in said body member,
   e. means operable by increased tension on said leader to close said switch to actuate said bulb,
   f. means operable to adjust the buoyancy of said float body member, and
   g. means operable to adjust the sensitivity of said electrical switch, said sensitivity adjusting means comprising a spring carried by said body member and yieldably resisting closure of said electric switch, and compression means operable to adjust the tension of said spring.

3. A fishing float as recited in claim 2 wherein said electric switch comprises a switch arm deflectable to contact a fixed switch member to close said switch, wherein said switch operating means comprises a stem engaged at one end with said switch arm and extending exteriorly of said body member for attachment of said fishing line to its opposite end, wherein said adjusting spring is disposed to resist movement of said stem in a direction toward said opposite end thereof, and abutting at the end thereof toward said switch arm against a member fixedly related to said stem, and wherein said spring adjusting means comprises a member threaded in said body member for movement parallel to said stem, and abutting the opposite end of said adjusting spring.

* * * * *